(12) United States Patent
Gaurav et al.

(10) Patent No.: US 7,703,099 B2
(45) Date of Patent: Apr. 20, 2010

(54) SCALABLE TRANSFORMATION AND CONFIGURATION OF EDI INTERCHANGES

(75) Inventors: Suraj Gaurav, Issaquah, WA (US); Surendra Machiraju, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 11/361,206

(22) Filed: Feb. 24, 2006

(65) Prior Publication Data

US 2007/0203926 A1    Aug. 30, 2007

(51) Int. Cl.
| | |
|---|---|
| G06F 9/46 | (2006.01) |
| G06F 17/00 | (2006.01) |
| G06Q 30/00 | (2006.01) |
| G07F 19/00 | (2006.01) |

(52) U.S. Cl. .................... 718/101; 705/26; 705/34; 715/202; 715/234; 715/239

(58) Field of Classification Search .................. 705/26, 705/27, 34; 719/313, 314, 315; 715/202, 715/209, 234; 718/101
See application file for complete search history.

(56) References Cited

U.S. PATENT DOCUMENTS

| | | |
|---|---|---|
| 4,729,096 A | 3/1988 | Larson |
| 4,787,035 A | 11/1988 | Bourne |
| 4,860,203 A | 8/1989 | Corrigan et al. |
| 4,951,196 A | 8/1990 | Jackson |
| 5,202,977 A | 4/1993 | Pasetes, Jr. et al. |
| 5,878,419 A | 3/1999 | Carter |
| 5,897,645 A | 4/1999 | Watters |
| 5,915,259 A | 6/1999 | Murata |
| 6,101,556 A | 8/2000 | Piskiel et al. |
| 6,256,667 B1 | 7/2001 | Wahlander et al. |
| 6,302,326 B1 | 10/2001 | Symonds et al. |
| 6,377,953 B1 | 4/2002 | Gawlick et al. |
| 6,418,400 B1 | 7/2002 | Webber |
| 6,442,569 B1 | 8/2002 | Crapo et al. |
| 6,591,260 B1 | 7/2003 | Schwarzhoff et al. |
| 6,609,200 B2 | 8/2003 | Anderson et al. |
| 6,687,873 B1 | 2/2004 | Ballantyne et al. |

(Continued)

FOREIGN PATENT DOCUMENTS

WO        0133369 A1    5/2001

(Continued)

OTHER PUBLICATIONS

Van De Putte, Geert, et al, "Implementing EDI Solution," Oct. 2003, IBM Redbook, 244 pages.

(Continued)

*Primary Examiner*—Hyung S Sough
*Assistant Examiner*—Charles E Anya
(74) *Attorney, Agent, or Firm*—Senniger Powers LLP (57) ABSTRACT

Transforming one or more of a collection of electronic data interchange (EDI) transactions. A type of EDI transactions is identified to be transformed from a source format to a destination format. The collection of the EDI transactions is received according to the source format. A particular one or more of the collection of the EDI transactions is identified corresponding to the identified type of EDI transactions. A transformation map is defined to transform the identified particular one or more of the transactions from the source format to the destination format. The identified particular one or more transactions is transformed according to the defined transformation map.

16 Claims, 5 Drawing Sheets

U.S. PATENT DOCUMENTS

| | | | |
|---|---|---|---|
| 6,735,598 B1 | 5/2004 | Srivastava | |
| 6,772,180 B1 | 8/2004 | Li et al. | |
| 6,785,689 B1 | 8/2004 | Daniel et al. | |
| 6,820,135 B1* | 11/2004 | Dingman et al. | 709/246 |
| 6,947,947 B2* | 9/2005 | Block et al. | 707/102 |
| 7,051,072 B2 | 5/2006 | Stewart et al. | |
| 7,249,157 B2 | 7/2007 | Stewart et al. | |
| 7,281,211 B2 | 10/2007 | Jeannette et al. | |
| 7,337,192 B2* | 2/2008 | Stark et al. | 707/104.1 |
| 7,340,422 B2* | 3/2008 | Fisher | 705/30 |
| 2001/0018697 A1 | 8/2001 | Kunitake et al. | |
| 2001/0049743 A1 | 12/2001 | Phippen et al. | |
| 2001/0056504 A1 | 12/2001 | Kuznetsov | |
| 2002/0042757 A1 | 4/2002 | Albazz et al. | |
| 2002/0049790 A1 | 4/2002 | Ricker et al. | |
| 2002/0083099 A1 | 6/2002 | Knauss et al. | |
| 2002/0103715 A1 | 8/2002 | Bennett et al. | |
| 2002/0111964 A1 | 8/2002 | Chen et al. | |
| 2002/0152175 A1 | 10/2002 | Armstrong et al. | |
| 2002/0178103 A1 | 11/2002 | Dan et al. | |
| 2003/0018666 A1 | 1/2003 | Chen et al. | |
| 2003/0101184 A1 | 5/2003 | Chiu et al. | |
| 2003/0121001 A1 | 6/2003 | Jeannette et al. | |
| 2003/0130845 A1 | 7/2003 | Poplawski | |
| 2003/0135482 A1* | 7/2003 | Takahashi et al. | 707/1 |
| 2003/0140048 A1 | 7/2003 | Meier et al. | |
| 2003/0149791 A1* | 8/2003 | Kane et al. | 709/246 |
| 2003/0149934 A1 | 8/2003 | Worden | |
| 2003/0154404 A1 | 8/2003 | Beadles et al. | |
| 2003/0158854 A1 | 8/2003 | Yoshida et al. | |
| 2003/0167446 A1 | 9/2003 | Thomas | |
| 2003/0182452 A1 | 9/2003 | Upton | |
| 2003/0233420 A1 | 12/2003 | Stark et al. | |
| 2004/0010753 A1 | 1/2004 | Salter et al. | |
| 2004/0107213 A1 | 6/2004 | Zubeldia et al. | |
| 2004/0153968 A1 | 8/2004 | Ching et al. | |
| 2004/0177094 A1 | 9/2004 | Jacobs et al. | |
| 2004/0193435 A1 | 9/2004 | Fang | |
| 2004/0205592 A1 | 10/2004 | Huang | |
| 2005/0004885 A1 | 1/2005 | Pandian et al. | |
| 2005/0005116 A1* | 1/2005 | Kasi et al. | 713/170 |
| 2005/0038816 A1 | 2/2005 | Easton | |
| 2005/0055631 A1 | 3/2005 | Scardina et al. | |
| 2005/0060317 A1 | 3/2005 | Lott et al. | |
| 2005/0063387 A1 | 3/2005 | Chen et al. | |
| 2005/0071344 A1 | 3/2005 | Chen et al. | |
| 2005/0114405 A1 | 5/2005 | Lo | |
| 2005/0131933 A1 | 6/2005 | Jha | |
| 2005/0132276 A1 | 6/2005 | Panditharadhya et al. | |
| 2005/0138648 A1 | 6/2005 | Ahmed et al. | |
| 2005/0150944 A1 | 7/2005 | Melick et al. | |
| 2005/0187973 A1 | 8/2005 | Brychell, III et al. | |
| 2005/0246415 A1 | 11/2005 | Belfiore et al. | |
| 2005/0256892 A1 | 11/2005 | Harken | |
| 2005/0256965 A1 | 11/2005 | Hohmann et al. | |
| 2005/0262130 A1 | 11/2005 | Mohan | |
| 2005/0278345 A1 | 12/2005 | Andra et al. | |
| 2006/0036522 A1 | 2/2006 | Perham | |
| 2006/0282448 A1* | 12/2006 | Schneider et al. | 707/101 |
| 2007/0005786 A1 | 1/2007 | Kumar et al. | |
| 2007/0022375 A1 | 1/2007 | Walker | |
| 2007/0112579 A1 | 5/2007 | Ratnakaran et al. | |
| 2007/0145138 A1 | 6/2007 | Snyder et al. | |
| 2007/0220051 A1 | 9/2007 | Brentano et al. | |

FOREIGN PATENT DOCUMENTS

| | | | |
|---|---|---|---|
| WO | 0155895 | A2 | 8/2001 |
| WO | 03021901 | A2 | 3/2003 |

OTHER PUBLICATIONS

Unknown, "4.0 Emerging Industry Frameworks/Repositories," http://www.dcnicn.com/XMLEDICentral/CDRL/HTML/Drafttask3delArpt/Draftask3delArpt-05.htm, printed on Jan. 2, 2006, 48 pages, USA.

Unknown, "Content Management Technology/Industry News, The Gilbane Report," http://gilbane.com/content management news.pl/2000/11/content management/news.html, Nov. 29, 2000, 30 pages Bluebill Advisors, Inc.

Kuramitsu Kimio et al, "Distributed Object-Oriented Schema to Share XML-based Catalogs among Business," Proceedings of the first International Conference on Web Information Systems Engineering, pp. 81-90, Jun. 2000, also available at http://xml.coverpages.org/kiki-wise2000.html, 16 pages, IEEE Press, USA.

Liu, Youzhong et al, "A Rule Warehouse System for Knowledge Sharing and Business Collaboration," UF CISE TR01-006A, http://www.cise.ufl.edu/tech reports/tr01/tr01-006.pdf, 2001, 67 pages, Database Systems R&D Center, University of Florida, FL.

Hinkelman, Scott, "Business Integration—Information Conformance Statements (BI-ICS)—An XML specification for declaring business information conformance," http://www.128.ibm.com/developerworks/xml/library/x-biics/, updated on Oct. 12, 2005, 4 pages, IBM, USA.

Unknown, "iWay Software 5.5: New Enhancements," http://www.iwaysoftware.com/products/iWay55 features.html, printed on Dec. 27, 2005, 3 pages, iWay Software, USA.

Unknown, "CaM: Content Assembly Mechanism—business transaction information management," http://www.oasis-open.org/committees/download.php/5929/CAM%20Technical%20brochure%2003Mar04.pdf, printed on Feb. 23, 2006, 7 pages, Oasis, USA.

Unknown, "EDI Tools," Stylus Studio, http://www.stylusstudio.com/edi/, printed on Jan. 2, 2006, 3 pages, Progress Software Corporation, USA.

Unknown, "OBOE—Open Business Objets for EDI An EDI and XML Software Developer's Toolkit," http://www.americancoders.com/OpenBusinessObjects/overview.html, updated on Oct. 31, 2005, 5 pages, Version 3.3.4, American Coders, Ltd., USA.

Unknown, "XML GUI Mappers with EDI Authoring Tools," http://www.redix.com/dtd13.htm, printed on Jan. 2, 2006, 4 pages, Redix International, Inc., USA.

Adams et al., "BizTalk Unleashed", Feb. 8, 2002, Sams, 54 selected pages.

"HIPAA Transaction Sets and Code Sets (HTSCS) 270 / 271 Companion Guide Specifications", Mar. 30, 2004, South Carolina Department of Health and Human Services, Version 1.1, [internet] http://www.scdhhshipaa.org, 38 pages.

* cited by examiner

SCALABLE TRANSFORMATION AND CONFIGURATION OF EDI INTERCHANGES

BACKGROUND

Electronic data interchange (EDI) is one of the ways businesses use for exchanging computer-to-computer business information based on approved formatting standards and schemas. For example, millions of companies around the world transmit data associated with business transactions (e.g., purchase orders, shipping/air bills, invoices, or the like) using EDI to conduct commerce.

In a typical EDI transaction model, a large business entity or an EDI integration broker trades with numerous partners and has the technical capability to handle numerous EDI transaction data in various EDI formats and schemas. These large business entities, also known as "hubs," transact with one or more suppliers, also known as "spokes". Each of the spokes typically is a relatively small business entity that is only capable of dealing with one hub.

Frequently, EDI documents are exchanged in batches between the hub and the spokes, and each batch may include multiple types or a collection of business documents. For example, the batch of EDI documents from the hub to the spokes may include: purchase order, payment advice, return material notifications etc.

Trading parties also may modify the EDI formats, and consequently the schemas associated with the EDI documents, during their course of conducting business to serve their business and integration needs. After such modification, business entities frequently use an EDI transformation system to transform EDI data or EDI messages formatted from the previous schema to the modified schema.

In transforming EDI transaction data formatted according to previous or old EDI schemas, EDI transformation systems (e.g., systems using XSLT) typically perform a transformation of all EDI transaction data from the previous EDI schemas to the new EDI formats. As such, such systems load the EDI message, which includes a batched transaction data with a size of 30 to 40 MB, in a memory storage area for the transformation to take place. This transformation thus unnecessarily poses a limit on the size of documents that can be loaded without compromising performance significantly. In addition, for the spokes that lack advanced processing equipment to handle such transformation efficiently, existing transformation method places heavy burden on the transformation performance and resources of the spokes.

SUMMARY

Embodiments of the invention overcome the shortcomings of the existing technology by transforming one or more particular transactions from a collection of EDI transactions. Embodiments of the invention selectively identify parts of the EDI message and transform only those EDI transactions that need to be transformed. Using the example above, embodiments of the invention enable the hub to transform/update the return material notification while processing the other transaction types while loading into the transform routine.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
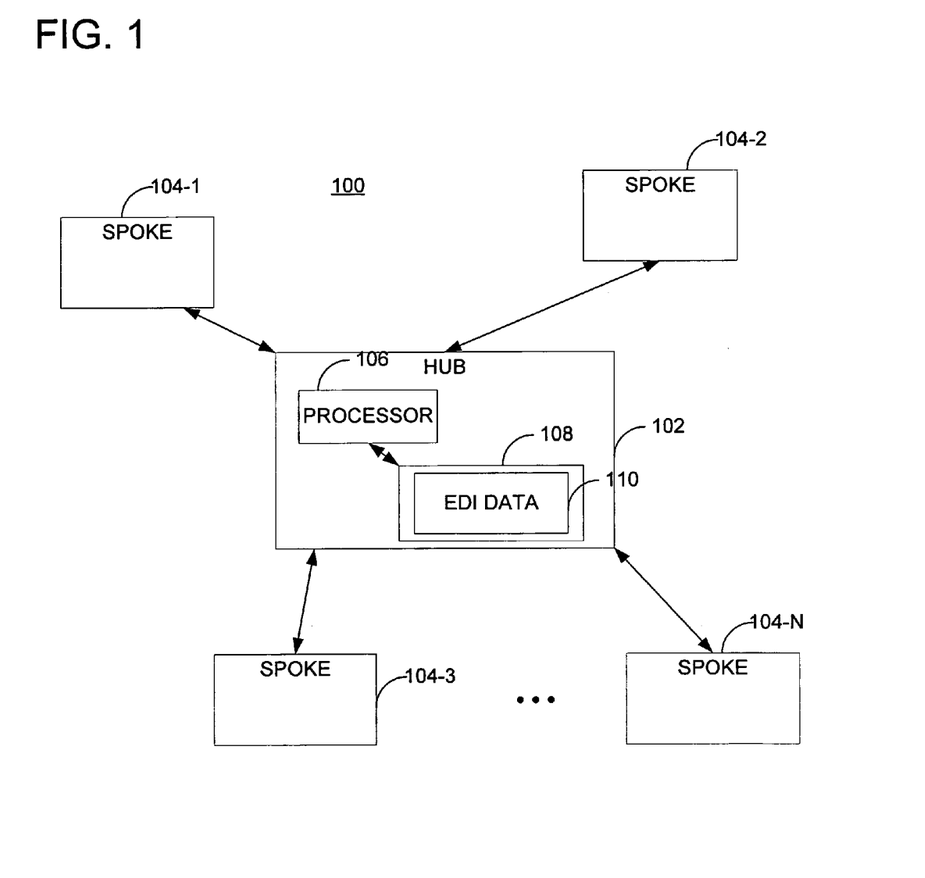
FIG. 1 is a block diagram illustrating a system for conducting electronic data interchange (EDI) transactions according to an embodiment of the invention.
Figure 5:
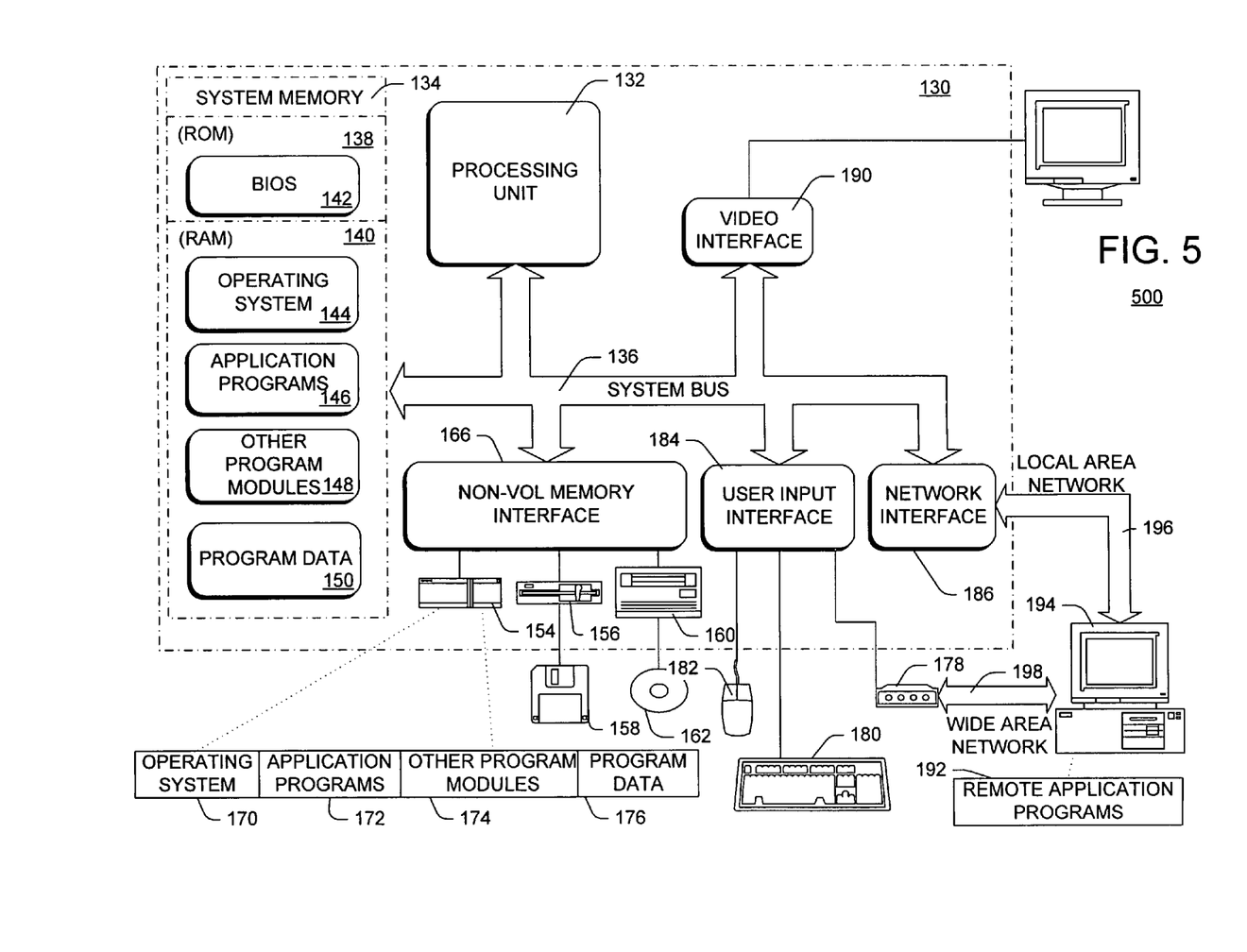
FIG. 5 is a block diagram illustrating one example of a suitable computing system environment in which the invention may be implemented.

Referring first to FIG. 1, a block diagram illustrates a system 100 for conducting electronic data interchange (EDI) transactions according to an embodiment of the invention. The system 100 includes a hub 102 linked to and communicating with one or more spokes 104. In one embodiment, the hub 102 includes a server computer or a computing device serving one or more processors (e.g., processor 106) or processing units for executing computer-executable instructions for serving the spokes 104. In one example, the spokes 104 include a computing device having one or more components included in or coupled with a computer 130, as shown in FIG. 5.

In one example, the hub 102 also includes a memory area 108 for storing one or more EDI schemas, such as an EDI schema 10. Initially, the hub 102 and the spokes 104 establish agreements as to the EDI formats or standards to be used for transmitting transaction data there between. Once the parties determine the particular EDI formats or standards to use, the hub 102 selects the appropriate EDI schemas to be transmitted to the spokes 104. In another example, the hub 102 may choose to select all EDI schemas for all types of transactions, such as purchase orders, bills of lading, invoices, payrolls, or the like, to the spokes 104. Although the communications between the hub 102 and the spokes 104 can be a private or public communications network, a wired or wireless network, the spokes 104 typically lack the hardware resources to handle large amount of EDI schemas sent from the hub 102. In addition, the type and bandwidth of computing network communications for the spokes 104 are not equipped to handle such demand imposed by the thousands of EDI schemas, which can reach several Gigabytes in data size.

Figure 2:
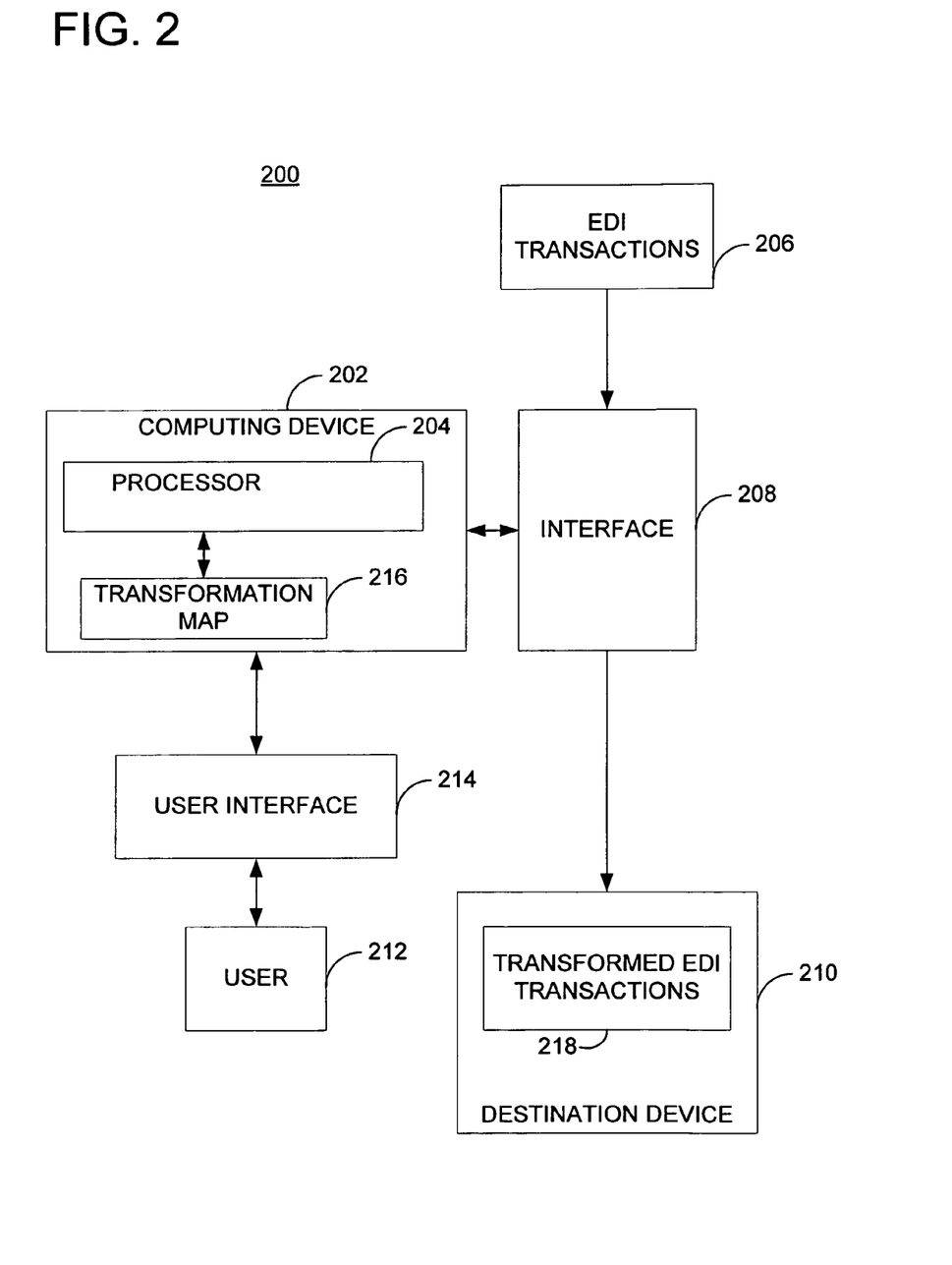
FIG. 2 is a block diagram illustrating a system for transforming one or more of a collection of EDI transactions according to an embodiment of the invention.

Referring now to FIG. 2, a block diagram depicts a system 200 for transforming one or more of a collection of EDI transactions according to an embodiment of the invention. In this example, a computing device 202 has a processor 204 executing computer-executable instructions. A collection of EDI transactions 206 is transmitted to the computing device 202 through an interface 208 (e.g., a communications network interface). In one embodiment, the collection of EDI transactions 206 may be streamed via a common communications network, either wired or wireless, from one or more sources, such as the spokes 104. In another embodiment, the collection of transactions 206 may be stored in a data store (not shown) coupled with the computing device 202 such that the processor 204 may access the collection of EDI transactions 206.

Initially, a trading partner 210 at a destination device may wish to modify a type of EDI transactions, such as a purchase order type. For example, the trading partner 210 may discover that it needs to insert a delimiter symbol, such as an asterisk, "*", at the end of each purchase order transactions. As such, the trading partner 210 needs to inform the computing device 202 of such change; otherwise, the destination device of the trading partner 210 would invalidate all purchase order transactions from the computing device 202 because they fail to conform to the new format.

As such, the trading partner 210 may communicate such desired change via regular communications channels, such as electronic mail, telephone, or the like, so that the existing purchase order transactions may be transformed. In one embodiment, the trading partner 210 and the computing device 202 may electronically communicate such modification via EDI so that the processor 204 at the computing device 202 can automatically transform the EDI transactions. In another embodiment, a user 212 accessing the computing device 202 may manually configure the modification via a user interface (UI) 214.

Once a type of EDI transactions is identified, the processor 204 receives the collection of the EDI transactions 206 according to the source format. For example, the source format may be an existing EDI format that the trading parties may have already agreed upon. As discussed above, the processor 204 may receive the EDI transactions from the source or the data store. Upon receiving the collection of the EDI transactions 206, the processor 204 identifies a particular one or more of the collection of the EDI transactions 206 corresponding to the identified type of EDI transactions. Using the purchase order example above, the processor 204 identifies the particular type (i.e., purchase order transactions) from the collection of EDI transactions 206.

Embodiments of the invention identify a particular set or a portion of the entire collection of the EDI transactions 206 for transformation. As such, the time and resources spent on processing transformation or modification to EDI transactions is greatly reduced. In contrast, in existing systems all transactions in the collection of EDI transactions 206 will go through a transformation process even though the transformation rules or instructions do not apply to some or most of the transactions.

After the processor 204 identifies the particular one or more transactions from the collection of EDI transactions 206, the processor 204 defines a transformation map 216 to transform the identified particular one or more of the transactions from the source format to the destination format. For example, the destination format may be a new format that is different from the source format. In this example, the destination format may include an extra character, such as "~", at the end of every invoice type of EDI transactions between the trading partners. For example, the transformation map 216 may include computer-executable instructions, codes, routines, or functions for transforming the identified particular transactions.

In one example, the transformation map 216 includes information relating to a change in date format from "DDMMYYYY" to "MMDDYYY". In another example, the transformation map 216 may include information relating to changes in unit of measure for ordered items (e.g., ponds (lbs) to kilograms (kg) in the purchase order type of transactions. As such, by using this defined transformation map 216, embodiments of the invention apply the desired transformation or modification inside any existing mapping routines to update the "Date" and/or "Unit of Measurement" per the destination party requirements. The processor 204 next transforms the identified particular one or more transactions according to the defined transformation map 216.

In an alternative embodiment, the processor 204 transmits a collection of transformed EDI transactions 218 to the trading partner 210 with the remaining untransformed transactions of the collection of EDI transactions 206 as one EDI message to the destination device of the trading partner 210. In another embodiment, the processor 204, during the transformation, modifies one or more delimiters delimiting the collection of the EDI transactions 206.

In one example, suppose all the incoming EDI transactions include a symbol "*" as the segment delimiter. During the transformation, the processor 204 may modify such delimiter to the return material authorization by inserting the symbol "*" after characters such as "CR" and "LF" characters.

In yet another alternative embodiment, the processor 204 automatically modifies segment counts in response to transforming of the particular one or more transactions. For example, the purchase order EDI transaction type sometimes includes a currency segment identifier "CUR", which is unacceptable to a processing or consuming application. As such, the processor 204 modifies the purchase order transaction by deleting the segment identifier and the segment totals is updated in the footer section of the EDI document.

In yet another alternative embodiment, the transformation map 216 includes one or more re-usable configuration units in the transformation map 216 for transforming the particular one or more transactions. For example, suppose a purchase order document includes a re-useable configuration unit for a specific value of the destination. The transformation map 216 may, during the transformation, define such configuration unit, and the processor 204 would transform the value by performing the following routine:

for (Purchase Order document and Supplier)=1;
   transform value in Record1 to Supplier1.

By selectively transform the particular type of transactions from the collection of EDI transactions 206, embodiments of the invention efficiently process transformation or modification of transactions from a source or an older format to a destination or a new format without demanding additional resources, such as memory and processing power.

Figure 3:
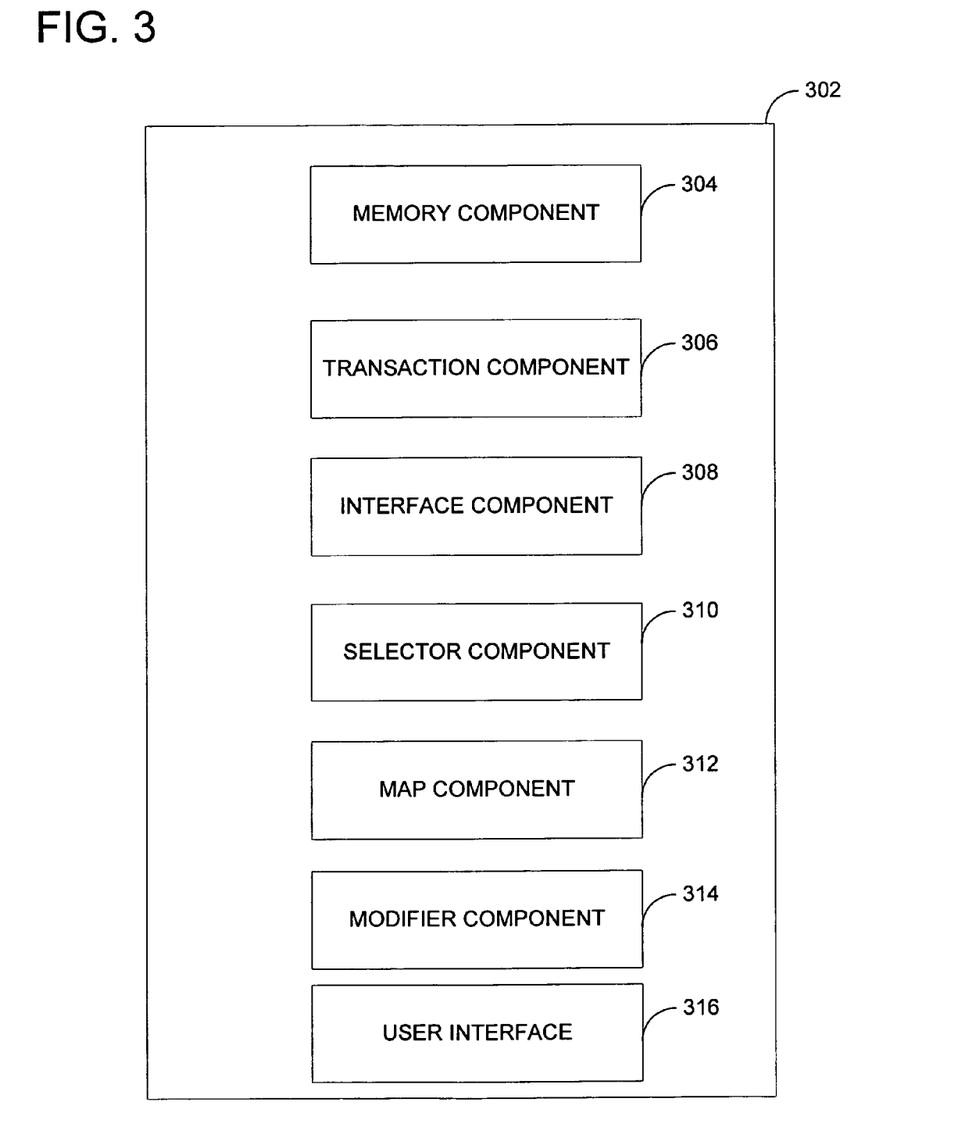
FIG. 3 is a block diagram illustrating an exemplary computer-readable medium on which aspects of the invention may be stored.

Referring now to FIG. 3, a block diagram illustrates an exemplary computer-readable medium 302 on which aspects of the invention may be stored. In one example, one or more computer-readable media, such as the computer-readable medium 302, execute computer-executable components to implement the method illustrated in FIG. 4, which is an exemplary flow chart illustrating operation of transforming one or more of a collection of EDI transactions according to an embodiment of the invention.

Figure 4:
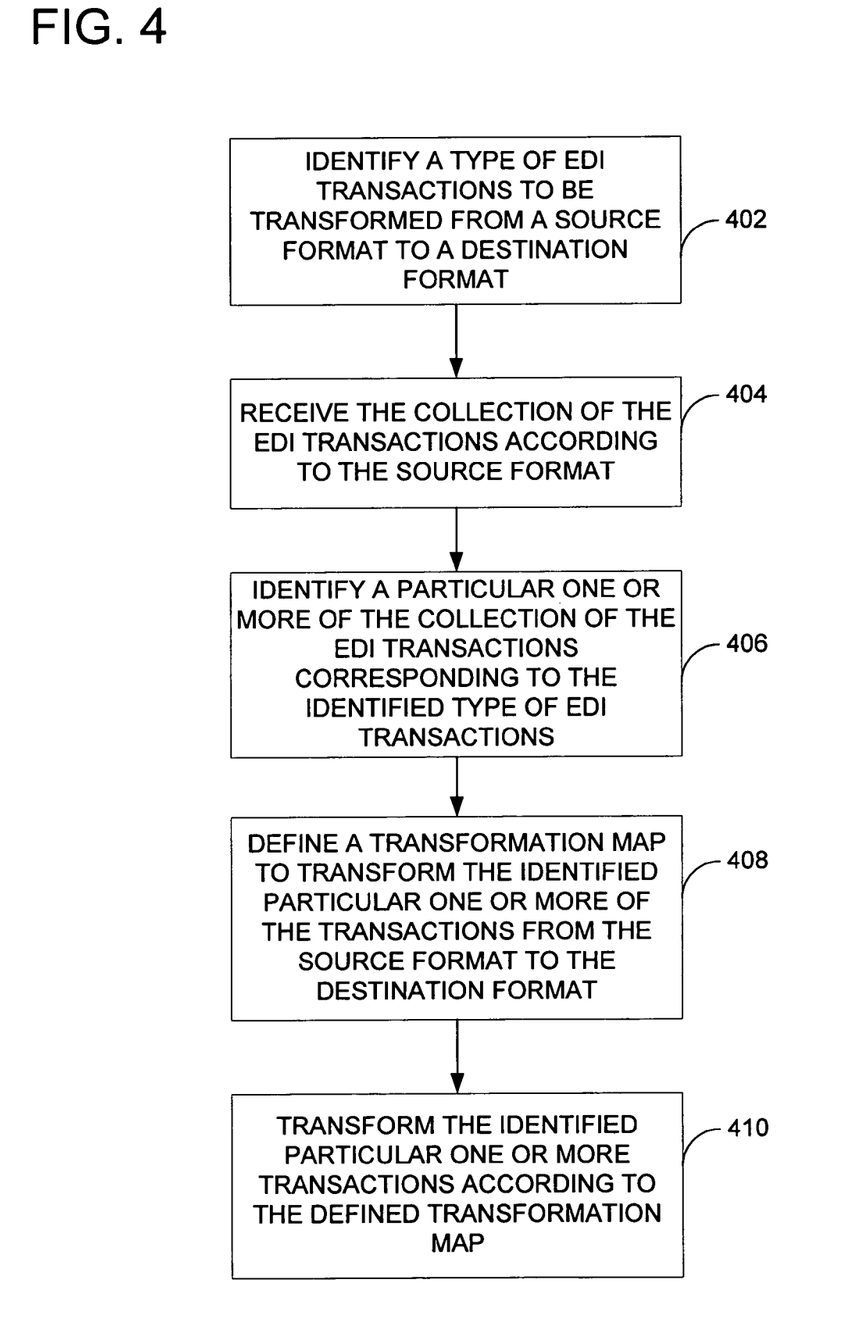
FIG. 4 is an exemplary flow chart illustrating operation of transforming one or more of a collection of EDI transactions according to an embodiment of the invention.

Initially, a memory component 304 stores the collection of EDI transactions. At 402, a transaction component 306 identifies a type of EDI transactions to be modified from a source format to a destination format. An interface component 308 receives the collection of the EDI transactions according to the source format at 404. At 406, a selector component 310 identifies a particular one or more of the collection of the EDI transactions corresponding to the identified type of EDI transactions. At 408, a map component 312 defines a map (e.g., transformation map 210) to modify or transform the identified particular one or more of the transactions from the source format to the destination format. At 410, a modifier component 314 modifies or transforms the identified particular one or more transactions according to the defined map. In an alternative embodiment, a user interface (UI) 316, either visually or audibly, provides the EDI transactions to a user, such as user 212.

In operation, embodiments of the invention may be implemented according to the following illustration. Suppose a spoke transmits a plurality of EDI transactions to a hub; the plurality of EDI transactions includes transactions such as purchase order, shipping bills, invoices, or the like. Without the knowledge of the spoke, the hub has modified its invoice processing software, and the new invoice processing software requires that all invoice transaction data transmitted via EDI must end with a plus symbol, "+".

Instead of request the spoke to retransmit the plurality of EDI transactions, the hub apply aspects of the invention by identifying a particular one or more of the collection of the EDI transactions, received by the hub, corresponding to the identified type of EDI transactions. In this scenario, the identified type of EDI transactions is the invoice type. Even though the EDI message from the spoke includes many other types of EDI transactions, embodiments of the invention identify the particular (i.e., invoice type) one or more of the EDI transactions. The hub next defines a transformation map to transform the identified particular one or more of the transactions from the source format to the destination format. In this illustration, the transformation map indicates that all invoice transaction data need to end with a "+" symbol. With the transformation map, the hub transforms the identified particular one or more transactions according to the defined transformation map such that the EDI transaction data, including the newly transformed invoice type of EDI transaction, transmitted from the spoke is efficiently processed.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB).

A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures, such as FIG. 4, to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for selectively transforming one or more transactions of a collection of electronic data interchange (EDI) transactions, said method comprising:
    identifying a type of EDI transactions from other types of EDI transactions to be transformed from a source format to a destination format;
    receiving the collection of the EDI transactions according to the source format;
    identifying one or more particular transactions from the collection of the EDI transactions corresponding to the identified type of the EDI transactions, said identified one or more particular transactions being different from remaining EDI transactions not identified in the collection;
    defining a transformation map to transform the identified one or more particular transactions in the collection from the source format to the destination format, said defined transformation map including selective transformation rules to be applied only to the identified one or more particular transactions without applying the included transformation rules to the remaining EDI transactions in the collection;
    transforming the identified one or more particular transactions in the collection by applying the transformation rules of the defined transformation map to only the one or more particular transactions and not applying the transformation rules to the remaining EDI transactions in the collection so that the remaining transactions in the collection are untransformed; and
    transmitting the transformed one or more particular transactions and the remaining untransformed transactions of the collection of EDI transactions as one EDI message to a destination device.

2. The method of claim 1, further comprising providing the EDI transactions via a user interface (UI), and wherein identifying comprising identifying the type of EDI transactions via the UI.

3. The method of claim 1, wherein transforming comprises modifying one or more delimiters delimiting the collection of the EDI transactions.

4. The method of claim 1, further comprising automatically modifying segment counts in response to transforming.

5. The method of claim 1, wherein defining comprises defining one or more re-usable configuration units in the transformation map for transforming the one or more particular transactions in the collection.

6. The method of claim 1, wherein one or more computer storage media have computer-executable instructions for performing the method of claim 1.

7. A system for selectively transforming one or more transactions of a collection of electronic data interchange (EDI) transactions, said system comprising:
    a processor configured to perform the steps of:
    identifying a type of EDI transactions from other types of EDI transactions to be transformed from a source format to a destination format;
    receiving the collection of the EDI transactions according to the source format;
    identifying one or more particular transactions from the collection of the EDI transactions corresponding to the identified type of the EDI transactions, said identified one or more particular transactions being different from remaining transactions not identified in the collection;
    defining a transformation map to transform the identified one or more particular transactions in the collection from the source format to the destination format, said defined transformation map including selective transformation rules to be applied only to the identified one or more particular transactions without applying the included transformation rules to remaining transactions in the collection;
    transforming the identified one or more particular transactions in the collection by applying the transformation rules of the defined transformation map to only the one or more particular transactions and not applying to the transformation rules to the remaining transactions in the collection so that the remaining transactions in the collection are untransformed; and
    transmitting the transformed one or more particular transactions and the remaining untransformed transactions of the collection of EDI transactions as one EDI message to a destination device.

8. The system of claim 7, further comprising a user interface (UI) for providing the EDI transactions to a user, and wherein the processor is configured to receive an instruction from the user via the UI for identifying the type of EDI transactions.

9. The system of claim 7, wherein the processor is configured to modify one or more delimiters delimiting the collection of the EDI transactions.

10. The system of claim 9, wherein the processor is further configured to automatically modify segment counts in response to transforming the identified particular one or more transactions.

11. The system of claim 7, wherein the processor is configured to define one or more re-usable configuration units in the transformation map for transforming the one or more particular transactions in the collection.

12. One or more computer storage media having computer-executable components for selectively modifying one or more transactions of a collection of electronic data interchange (EDI) transactions, said computer-executable components comprising:
    a memory component for storing the collection of EDI transactions;
    a transaction component for identifying a type of EDI transactions from other types of EDI transactions to be modified from a source format to a destination format;
    an interface component for receiving the collection of the EDI transactions according to the source format;

a selector component for identifying one or more particular transactions from the collection of the EDI transactions corresponding to the identified type of EDI transactions;

a map component for defining a map to modify the identified one or more particular transactions in the collection from the source format to the destination format, said defined map including selective modification rules to be applied only to the identified one or more particular transactions without applying the included modification rules to remaining transactions in the collection; and a modifier component for modifying the identified one or more particular transactions in the collection by applying the modification rules of the defined map to only the one or more particular transactions and not applying to the modification rules to the remaining transactions in the collection so that the remaining transactions in the collection are unmodified; and wherein the interface component transmits the modified one or more particular transactions and the remaining unmodified transactions of the collection of EDI transactions as one EDI message to a destination device.

13. The computer storage media of claim 12, further comprising a user interface (UI) for providing the EDI transactions to a user, and wherein the transaction component receives an instruction from the user via the UI for identifying the type of EDI transactions.

14. The computer storage media of claim 12, wherein the modifier component modifies one or more delimiters delimiting the collection of the EDI transactions.

15. The computer storage media of claim 14, wherein the modifier component further automatically modifies segment counts in response to modifying the identified particular one or more of the transactions.

16. The computer storage media of claim 12, wherein the map component defines one or more re-usable configuration units in the map, and wherein the modifier component modifies the one or more particular transactions in the collection as a function of the one or more defined re-useable configuration units.

* * * * *